United States Patent [19]

Arlett

[11] 4,031,621

[45] June 28, 1977

[54] HAND TOOLS

[75] Inventor: John Arlett, Camberley, England

[73] Assignee: Wilkinson Sword Limited, England

[22] Filed: July 16, 1976

[21] Appl. No.: 706,119

[30] Foreign Application Priority Data

July 16, 1975 United Kingdom ............ 29737/75

[52] U.S. Cl. ................................................. 30/262
[51] Int. Cl.² ........................................ B26B 13/16
[58] Field of Search ..................... 30/261, 262, 254; 81/321, 322, 323

[56] References Cited

UNITED STATES PATENTS

| 2,310,959 | 2/1943 | James | 30/262 X |
| 2,734,268 | 2/1956 | Grinling | 30/262 X |
| 3,559,286 | 2/1971 | Pfaffenbach | 30/261 |
| 3,775,846 | 12/1973 | Johnson | 30/262 |

FOREIGN PATENTS OR APPLICATIONS

| 960,485 | 6/1964 | United Kingdom | 30/262 |

Primary Examiner—James L. Jones, Jr.
Assistant Examiner—J. C. Peters
Attorney, Agent, or Firm—Leydig, Voit, Osann, Mayer & Holt, Ltd.

[57] ABSTRACT

A hand tool, such as a pruner, has two pivotally movable members which are biassed open by a spring. A catch, for locking the tool in the closed position, is fitted into a non-circular aperture in a part of one of the members which overlaps the other member, the shank of the catch being undercut to allow the catch to rotate in the aperture, but prevent its withdrawal from the aperture except in the rotational position in which it was inserted into the aperture. A detent is provided, for rotation by the catch to engage and lock the members together. The member containing the catch is so shaped that the detent can be fitted to or withdrawn from the catch only in a position in which the shank of the catch is locked in the member. Consequently, so long as the detent remains in position in the catch, the catch cannot be removed.

8 Claims, 8 Drawing Figures

HAND TOOLS

This invention relates to hand tools comprising two cooperating members which are arranged to be moved relatively to one another by handles which are connected to the respective cooperating members. Examples of such tools include garden pruners, lawn-edge trimmers, and scissor-like tools for kitchen and household use.

It is conventional in such a hand tool for the members to be spring-biassed apart, and for a catch to be provided which is operable by the user to lock the members in a closed position. Occasionally it is arranged that the catch is also movable into a position in which it limits the extent to which the members can move apart.

According to the present invention there is provided a hand tool comprising two members which are movable relatively to one another by handles connected to the respective members and a manually-operable catch having a shank mounted for rotation in one of said members and including a detent rotatable by the catch into or out of a position in which it prevents or restricts relative movement between the members, the shank being received in an aperture of said one member which is so shaped relative to the shank that over a predetermined range of rotation of the catch away from the position in which the shank was inserted into the aperture, the shank is prevented from withdrawal from the aperture, and said one member is so shaped that it permits the detent to be fitted to or removed from the shank only when the catch is within said range of rotation and, after fitment of the detent, restricts rotation of the catch to said predetermined range.

The present invention also provides a hand tool comprising two members which are movable relatively to one another by handles connected to the respective members, a catch mounted on one of said members and manually-operable to lock the members against relative movement in at least one direction, the catch comprising a head portion, a non-circular shank and a detent supported by the shank, said one member containing an aperture shaped to fit and receive the shank therein but part of the shank having a peripherally extending slot to permit rotation of the shank when fully inserted into the aperture and to lock the shank against withdrawal from the aperture over a predetermined range of rotation of the catch within the aperture, the detent being engageable with and disengageable from the shank only when the shank is within said range of rotation and serving to restrict the shank to said range of rotation, the other member having at least one abutment thereon and said detent being movable by rotation of the catch into and out of a position in which it can engage said abutment to prevent said relative movement of the members.

One construction of hand tool in accordance with the present invention will now be described, by way of example only, with reference to the accompanying drawings in which.

Figure 1:
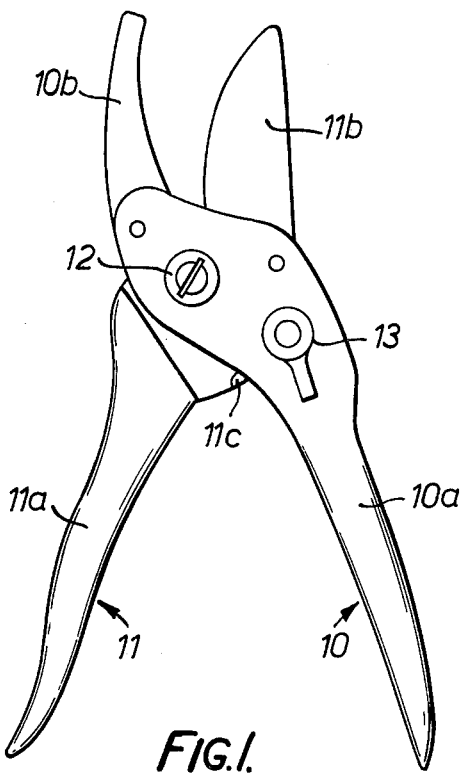
FIG. 1 is a side view of a pruner incorporating a catch.
Figure 3:
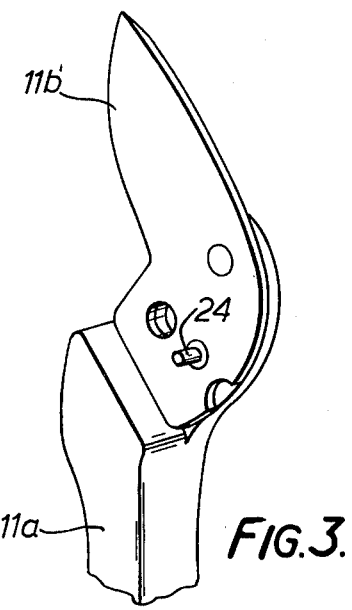
FIG. 3 is a perspective view of one blade and portion of the handle connected thereto, seen from the side opposite to that seen in FIG. 2.
Figure 2:
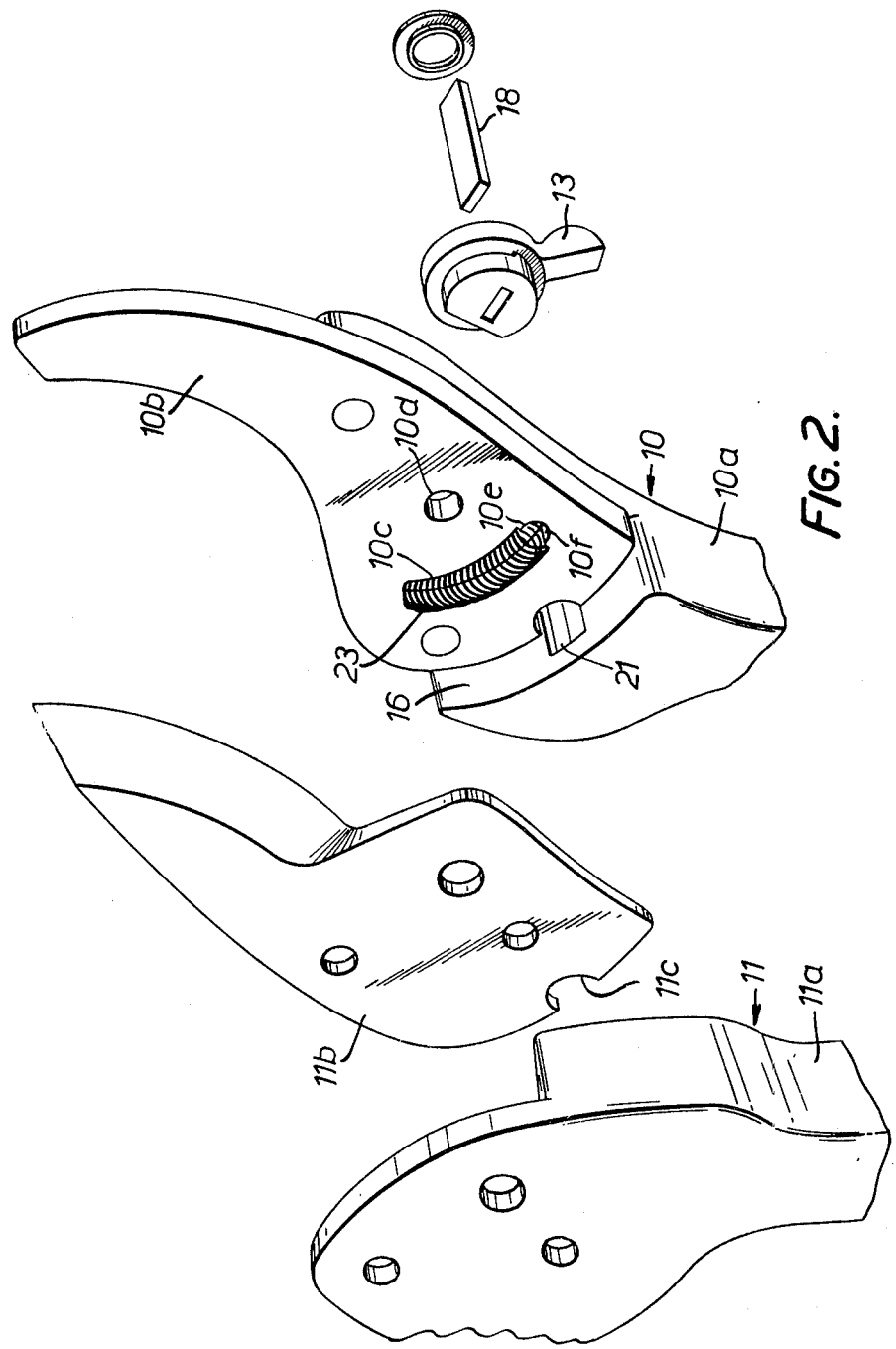
FIG. 2 is an exploded perspective view of the main part of the pruner of FIG. 1 showing the blades of the pruner and portions of the handles connected thereto, and parts of the catch.

Although the illustrated embodiment of the invention is a garden pruner, it will be apparent that the invention is applicable to any type of hand tool having a similar action.

As shown in the drawing, the pruner comprises two members 10, 11 which are interconnected by a pivot bolt 12, the member 10 consisting of a handle 10a and female blade 10b and the member 11 consisting of a handle 11a and male blade 11b. Each blade is riveted to, or located by pins on, its associated handle. By squeezing the handles in the hand of the user, the blades are brought together in a cutting action. A rotary catch 13 is mounted in the member 10 for rotation about an axis parallel to the pivot bolt. This catch incorporates a detent which, when the pruner is closed, can be rotated by rotation of the catch to engage a notch 11c in the blade 11b or handle 11a to lock the handles in the closed position. The notch 11c could be stepped so that the handles would be locked when the detent engages the notch to its full depth, but restricted movement of the handles would be permitted by partial engagement of the detent in the notch.

Figures 5A, 5B:
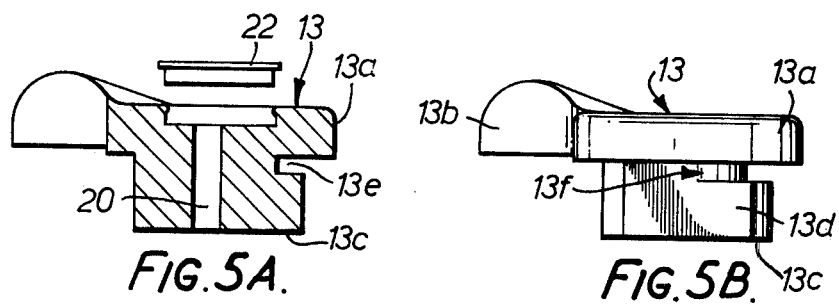
FIGS. 5a, 5b and 5c are respectively a sectional view, a side elevation and a plan of the catch itself.
Figure 5C:
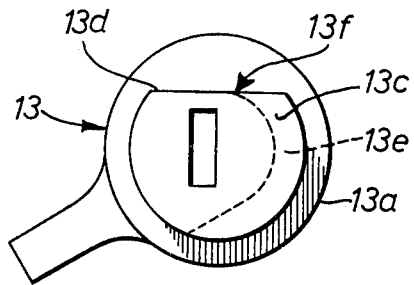

Considering the catch in detail, with particular reference to FIGS. 5a, 5b and 5c, the catch comprises a disc portion 13a having a radially extending finger plate 13b and a drum shaped shank portion 13c mounted coaxially on the disc portion. The shank portion 13c is cylindrical but for a flat 13d in its cylindrical surface designed to render the periphery of the shank portion non-circular, a part of the shank portion adjacent the disc being undercut around approximately 180° of the periphery to form a groove 13e merging at one end into the flat on the periphery at 13f.

The handle 10a of the pruner which receives the catch has a bore 14 (FIG. 4a) extending parallel to the pivot axis, the bore being generally cylindrical and of a diameter matching the diameter of the shank portion of the catch, yet having a chord shaped web 15 (FIG. 4b) blanking off part of the circular bore at the outside surface of the handle to match the flat 13d on the shank portion of the catch. The thickness of this web matches the width of the undercut groove 13e.

It will be evident therefore that the size and shape of the non-circular aperture forming the entry of the bore in the handle matches the size and overall shape of the shank portion of the catch and permits the catch to be fitted into this aperture in only one rotational position of the catch. When the shank portion of the catch has been fully inserted into the aperture so that the disc portion lies flat against the outside surface of the handle, the catch can be rotated since the chord shaped web 15 will then register with the groove 13e. Once the catch has been rotated out of the position in which it was inserted, it is locked in the handle by engagement of the chord shaped web 15 in the groove 13e. The extent to which the catch can be rotated will be determined by the arcuate extent of the undercut groove, which in the illustrated case is about 180°. This is more than adequate to contain the normal range of rotation of the catch (for example 90°) between its operative position and its inoperative position.

Figure 4A:
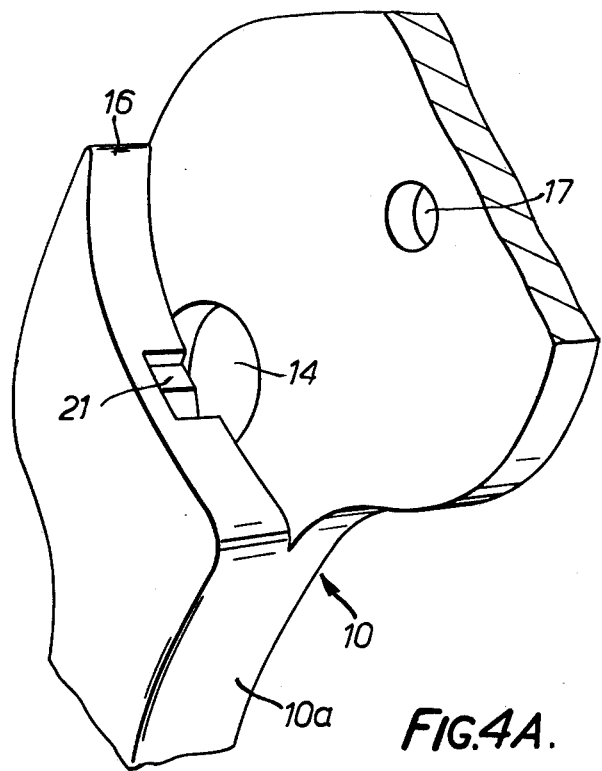
FIG. 4a is a perspective view of part of the other handle with the blade removed.
Figure 4B:
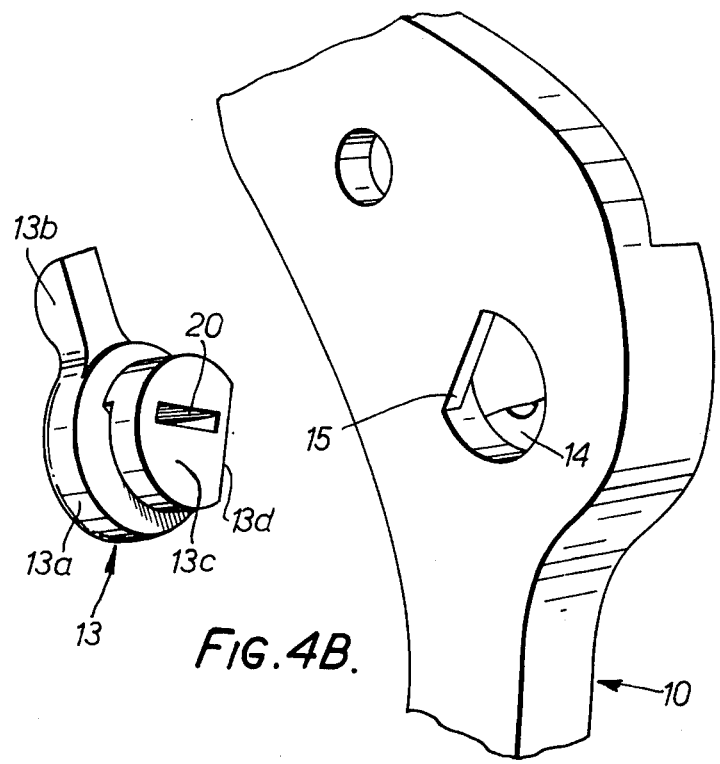
FIG. 4b is a view of the handle of FIG. 4a from the opposite side.

As seen in FIG. 4a of the drawings, the side of the handle opposite that from which the catch is inserted is formed with a step 16, which is arcuate about a pivot-receiving hole 17. The complementary blade 11b of the pruner is shaped to have an arcuate peripheral portion which fits against the step. This arcuate portion contains the notch 11c so that when a detent 18, projecting from the shank portion of the catch, is rotated by rotation of the catch it will engage in or become disengaged from the notch in the cooperating handle or blade.

In the present embodiment, this detent 18 is formed by a rectangular section pin or peg which is received in a generally axial slot 20 extending through the catch, and when fully inserted projects beyond the free end of the shank portion. This projecting portion of the detent 18 lies flush with the step in an inoperative position of the catch but projects from the step when the catch has been rotated (for example through 90°) into an operative position.

Moreover, a recess 21 in the step into which the detent projects is shaped to fit the locus of rotation of the detent between the operative and inoperative positions of the catch, so that the detent cannot be inserted until the catch has been rotated into the position in which it is locked in the handle. Consequently withdrawal of the catch from the handle is prevented so long as the detent remains fitted in the catch. Preferably the external surface of the disc portion of the catch is recessed to receive a decorative cap 22 which conceals the detent, the cap being retained in position either by friction or by adhesive.

The spring, by which the handles are urged apart, can be of any suitable type, but forms no part of the present invention. A suitable spring arrangement forms the subject of a separate patent application filed simultaneously as the present application.

I claim:

1. A hand tool comprising two members, two handles connected to the respective members and movable to move said members relatively to one another and a manually-operable catch having a shank mounted for rotation in one of said members and including a detent rotatable by the catch into and out of a position in which it prevents or restricts relative movement between the members, the shank being received in an aperture of said one member which is so shaped relative to the shank that over a predetermined range of rotation of the catch away from the position in which the shank was inserted into the aperture, the shank is prevented from withdrawal from the aperture, and said one member is so shaped that it permits the detent to be fitted to or removed from the shank only when the catch is within said range of rotation and, after fitment of the detent, restricts rotation of the catch to said predetermined range.

2. A hand tool comprising two members, two handles connected to the respective members and movable to move said members relatively to one another, a catch mounted on one of said members and manually-operable to lock the members against relative movement in at least one direction, the catch comprising a head portion, a non-circular shank and a detent supported by the shank, said one member containing an aperture shaped to fit and receive the shank therein but part of the shank having a peripherally extending slot to permit rotation of the shank when fully inserted into the aperture and to lock the shank against withdrawal from the aperture over a predetermined range of rotation of the catch within the aperture, the detent being engageable with and disengageable from the shank only when the shank is within said range of rotation and serving to restrict the shank to said range of rotation, the other member having at least one abutment thereon and said detent being movable by rotation of the catch into and out of a position in which it can engage said abutment to prevent said relative movement of the members.

3. A hand tool according to claim 2, wherein said aperture is of circular shape except for a projection extending into the aperture, the shank of the catch being of substantially cylindrical shape but having a recessed portion along its length corresponding to the shape of the projection.

4. A hand tool according to claim 3, wherein the width of the slot longitudinally of the shank corresponds to the depth, in the same direction, of the projection.

5. A hand tool according to claim 3, wherein said projection is a chordwise-extending web.

6. A hand tool according to claim 1, wherein said detent is a flat rod received in a correspondingly shaped axial slot in said shank.

7. A hand tool according to claim 6, wherein said member contains a recess into which said detent projects, the shape of the recess restricting the rotation of said detent to said predetermined range.

8. A hand tool according to claim 7, wherein said recess is contained in a step on said one member which step lies alongside the path of movement of an edge of said other member, said edge containing a notch into which said detent can be rotated to lock the members together.

* * * * *